US008920606B2

(12) United States Patent
Wright

(10) Patent No.: US 8,920,606 B2
(45) Date of Patent: Dec. 30, 2014

(54) PREPARATION OF POLYVINYLAMIDE CELLULOSE REACTIVE ADDUCTS

(71) Applicant: BASF SE, Ludwigshafen (DE)

(72) Inventor: Matthew D. Wright, Smithfield, VA (US)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/707,491

(22) Filed: Dec. 6, 2012

(65) Prior Publication Data

US 2013/0139985 A1     Jun. 6, 2013

Related U.S. Application Data

(60) Provisional application No. 61/567,421, filed on Dec. 6, 2011.

(51) Int. Cl.
| | | |
|---|---|---|
| D21H 17/33 | (2006.01) | |
| D21H 17/34 | (2006.01) | |
| D21H 17/38 | (2006.01) | |
| D21H 17/45 | (2006.01) | |
| D21H 17/47 | (2006.01) | |
| D21H 23/04 | (2006.01) | |
| D21H 23/22 | (2006.01) | |
| C08F 8/28 | (2006.01) | |
| C08F 20/56 | (2006.01) | |
| C08F 222/38 | (2006.01) | |
| C08F 220/56 | (2006.01) | |

(52) U.S. Cl.
CPC ............. *C08F 222/38* (2013.01); *C08F 220/56* (2013.01); *C08F 8/28* (2013.01)

USPC ................... 162/168.3; 162/158; 162/164.1; 162/164.6; 162/166; 162/168.1; 162/168.2; 162/183; 162/184; 162/185; 525/50; 525/51; 525/154; 525/326.1; 525/328.2; 525/329.4

(58) Field of Classification Search
USPC ................ 162/158, 164.1, 164.3, 164.6, 166, 162/168.1–168.3, 183–185; 525/50, 51, 55, 525/154, 383, 326.1, 328.2–328.4, 329.4, 525/331.4; 524/47
See application file for complete search history.

(56) References Cited

U.S. PATENT DOCUMENTS

| 3,556,392 A | 1/1971 | Dorothy Robin |
| 3,556,932 A | 1/1971 | Coscia et al. |
| 3,580,736 A | 5/1971 | Moyer et al. |

(Continued)

FOREIGN PATENT DOCUMENTS

| CN | 102167768 A | 8/2011 |
| DE | 4413720 A1 | 10/1995 |

(Continued)

OTHER PUBLICATIONS

Smook, Gary A., Handbook for Pulp and Paper Technologists, 2nd ed, Angus Wilde Publications, 1992, pp. 207-208.*

(Continued)

*Primary Examiner* — Dennis Cordray
(74) *Attorney, Agent, or Firm* — Drinker Biddle & Reath; Shiela A. Loggins

(57) ABSTRACT

The present disclosure is directed to a continuous process for preparing cellulose reactive adducts of polyvinylamide.

20 Claims, 3 Drawing Sheets

(56) References Cited

U.S. PATENT DOCUMENTS

| | | |
|---|---|---|
| 3,728,214 A | 4/1973 | Espy |
| 3,759,197 A | 9/1973 | Bracke |
| 4,103,742 A | 8/1978 | Swanson |
| 4,144,123 A | 3/1979 | Scharf et al. |
| 4,155,405 A | 5/1979 | Vio |
| 4,217,425 A | 8/1980 | Ballweber et al. |
| 4,421,602 A | 12/1983 | Brunnmueller et al. |
| 4,506,062 A | 3/1985 | Flesher et al. |
| 4,528,321 A | 7/1985 | Allen et al. |
| 4,599,379 A | 7/1986 | Flesher et al. |
| 4,603,176 A | 7/1986 | Bjorkquist et al. |
| 4,605,702 A | 8/1986 | Guerro et al. |
| 4,673,704 A | 6/1987 | Flesher et al. |
| 4,954,538 A | 9/1990 | Dauplaise et al. |
| 5,037,927 A | 8/1991 | Itagaki et al. |
| 5,041,503 A | 8/1991 | Dauplaise et al. |
| 5,085,787 A | 2/1992 | Pinschmidt, Jr. et al. |
| 5,281,307 A | 1/1994 | Smigo et al. |
| 5,290,880 A | 3/1994 | Moench et al. |
| 5,320,711 A | 6/1994 | Dauplaise et al. |
| 5,374,334 A | 12/1994 | Sommese et al. |
| 5,723,022 A | 3/1998 | Dauplaise et al. |
| 5,863,879 A | 1/1999 | Zirnstein et al. |
| 6,001,920 A | 12/1999 | Ghafoor et al. |
| 6,031,037 A | 2/2000 | Ghafoor et al. |
| 6,159,340 A | 12/2000 | Niessner et al. |
| 6,576,086 B1 | 6/2003 | Ettl et al. |
| 6,616,807 B1 | 9/2003 | Dyllick-Brenzinger et al. |
| 6,797,785 B1 | 9/2004 | Hund et al. |
| 6,824,659 B2 | 11/2004 | Bayley et al. |
| 7,034,068 B1 | 4/2006 | Negele et al. |
| 7,090,745 B2 | 8/2006 | Beckman et al. |
| 7,482,417 B2 | 1/2009 | Kiyosada et al. |
| 7,641,766 B2* | 1/2010 | St. John et al. ............... 162/166 |
| 7,875,676 B2 | 1/2011 | Wright |
| 8,197,640 B2 | 6/2012 | Schaffer |
| 8,222,343 B2 | 7/2012 | Wright |
| 8,262,859 B2* | 9/2012 | Wright .................. 162/166 |
| 8,299,180 B2* | 10/2012 | Wright .................. 525/155 |
| 2004/0118540 A1 | 6/2004 | Garnier et al. |
| 2005/0161181 A1 | 7/2005 | St. John et al. |
| 2005/0187356 A1 | 8/2005 | Hagiopol et al. |
| 2006/0016906 A1 | 1/2006 | Matsumoto |
| 2006/0065380 A1 | 3/2006 | Garnier et al. |
| 2006/0162886 A1 | 7/2006 | Smith et al. |
| 2008/0064819 A1 | 3/2008 | Wright |
| 2009/0223645 A1* | 9/2009 | Zhang et al. ............... 162/164.6 |
| 2011/0083821 A1 | 4/2011 | Wright |
| 2011/0146925 A1* | 6/2011 | Bode et al. ................. 162/164.1 |

FOREIGN PATENT DOCUMENTS

| | | |
|---|---|---|
| EP | 0102760 A2 | 3/1984 |
| EP | 0126528 A2 | 11/1984 |
| EP | 0150933 A2 | 8/1985 |
| EP | 0170394 A2 | 2/1986 |
| GB | 1576447 A | 10/1980 |
| JP | Sho 40-024926 | 10/1965 |
| JP | 2003238631 A | 8/2003 |
| WO | WO-95/29221 A1 | 11/1995 |
| WO | WO-9831748 A1 | 7/1998 |
| WO | WO-9831749 A1 | 7/1998 |
| WO | WO-0011046 A1 | 3/2000 |
| WO | WO-2006/016906 A1 | 2/2006 |
| WO | 2006/102059 A2 | 9/2006 |
| WO | WO-2006/102059 A2 | 9/2006 |
| WO | 2008/028865 A2 | 3/2008 |
| WO | 2009/059725 A2 | 5/2009 |

OTHER PUBLICATIONS

Search Report dated May 9, 2007, issued in Chilean Application No. 2581-07.

International Search Report mailed Jul. 11, 2008, in International Application No. PCT/EP2007/059096 filed Aug. 31, 2007.

Search Report dated Feb. 7, 2007, issued in British Application No. GB0620842.5.

International Search Report dated Jan. 30, 2014 for PCT/IB2012/002813.

Written Opinion of the International Searching Authority dated Jan. 30, 2014 for PCT/IB2012/002813.

International Preliminary Report on Patentability dated Jun. 10, 2014 for PCT/IB2012/002813.

* cited by examiner

PREPARATION OF POLYVINYLAMIDE CELLULOSE REACTIVE ADDUCTS

CROSS-REFERENCE TO RELATED APPLICATIONS

This application claims the benefit pursuant to 35 U.S.C. §119(e) of U.S. Provisional Application No. 61/567,421, filed Dec. 6, 2011, which is hereby incorporated herein by reference in its entirety.

FIELD

The present disclosure is directed to a method for preparing a cellulose reactive adduct of polyvinylamide, the resulting adduct, methods of using the adduct and products comprising the adduct.

BACKGROUND

The use of synthetic water-soluble polymers as wet end additives for the strengthening of paper and paperboard is widely practiced. The use of cellulose reactive water-soluble vinylamide copolymers as paper strengthening agents is also common. One particular class of vinylamide polymer strength aids includes vinylamide polymers, which are modified with glyoxal or cellulose reactive agents in such a way as to be thermosetting.

Improvements in the methods and products of the prior art would be useful.

SUMMARY

The following embodiments meet and address these needs. The following summary is not an extensive overview. It is intended to neither identify key or critical elements of the various embodiments, nor delineate the scope of them.

Methods for preparing a cellulose reactive functionalized polyvinylamide adduct using a continuous process are provided. The method comprises reacting a substantially aqueous reaction mixture of a vinylamide polymer and a cellulose reactive agent at a temperature of about 1° C. to about 65° C. and a reaction pH set point of about 8.5 to about 12, for about 1 minutes to about 300 minutes,
wherein:
i) the temperature of incoming water is measured;
ii) the pH of the reaction mixture is adjusted to maintain an approximately constant reaction rate;
iii) between 10% and 90% of the cellulose reactive agent is consumed, and the molar ratio of the amide functionality on the vinylamide polymer to cellulose reactive agent is between 10 to 1 and 1 to 1; and
iv) the concentration of the vinylamide polymer prior to and during formation of the adduct is about 0.25-15% of the total reaction mixture, thereby forming the adduct.

Additionally, the method comprises the step of reacting a substantially aqueous reaction mixture of a vinylamide polymer and a cellulose reactive agent at a temperature of about 1° C. to about 65° C. and a reaction pH set point of about 8.5 to about 12, for about 1 minutes to about 300 minutes,
wherein:
i) the temperature of incoming water is measured;
ii) the pH of the reaction mixture may be adjusted to maintain a constant reaction rate based on the following equation:

$$pH = -0.0404T + 10.961 \quad \text{Eq. 1}$$

where: pH=reaction pH set point
T=reaction temperature (° C.);
iii) between 10% and 90% of the cellulose reactive agent is consumed, and the molar ratio of the amide functionality on the vinylamide polymer to cellulose reactive agent molar ratio is between 10 to 1 and 1.5 to 1; and
iv) the concentration of the vinylamide polymer prior to and during formation of the adduct is about 0.25-15% of the total reaction mixture, thereby forming the adduct.

The adduct of the present method can be prepared at a temperature of about 2° C. to about 60° C. and a pH of about 8.5 to about 11.5, and a reaction time of about 2 to 200 minutes.

The adduct of the present method can be prepared at a temperature of about 2° C. to about 50° C. and a pH of about 8.8 to about 11.5, for about 2 to 150 minutes.

The adduct can be prepared at a temperature of about 2° C. to about 40° C. and a pH of about 9.0 to about 11.5, for about 5 to 60 minutes.

The adduct of the present method can be prepared at a temperature of about 4° C. to about 40° C. and a pH of about 9.0 to about 11.5, for about 2 to 120 minutes.

The adduct of the present method can be prepared at a temperature of about 4° C. to about 30° C. and a pH of about 9.5 to about 11.5, for about 2 to 90 minutes.

The concentration of the vinylamide polymer prior to and during formation of the adduct can be about 0.5% to 6%. The concentration of the vinylamide polymer prior to and during formation of the adduct can also be about 1.0% to 3.0%. Furthermore, the concentration of the vinylamide polymer prior to and during formation of the adduct can be about 2%.

About 12% to 85% of the cellulose reactive agent can be consumed during the course of the present method. Furthermore, about 20% to 75% of the cellulose reactive agent can be consumed during the course of the present method.

The adduct of the present method can be added to an aqueous cellulosic slurry.

The adduct of the present method can be added to paper or board.

The adduct of the present method can be added to paper or board as a film or coating.

The cellulose reactive functionalized polyvinylamide adduct obtained by the present method can be a water-soluble thermosetting resin.

The cellulose reactive functionalized polyvinylamide adduct obtained by the present method can contain more than one aldehyde functionality.

The cellulose reactive agent can be glyoxal, glutaraldehyde, furan dialdehyde, 2-hydroxyadipaldehyde, succinaldehyde, dialdehyde starch, diepoxy compounds, or combinations thereof.

The vinylamide polymer can be a homopolymer or copolymer formed from (meth)acrylamide, or a substituted (meth) acrylamide. The vinylamide polymer can also be nonionic, cationic, potentially cationic, anionic, potentially anionic or amphoteric, or combinations thereof. Furthermore, the vinylamide polymer can be formed from (meth)acrylamide monomer or a substituted (meth)acrylamide monomer and a cationic monomer selected from the group consisting of diallyldialkyl ammonium salts, (dialkylamino)alkyl(meth) acrylates acid addition or quaternary salts, 2-vinylpyridines acid addition or quaternary salts, dialkylamino alkyl(meth) acrylamides acid addition or quaternary salts, (p-vinylphenyl)-trimethylammonium chloride, and 1-methacryloyl-4-methyl piperazine, and acid addition or quaternary ammonium salts thereof. The vinylamide polymer can be formed from about 20 to about 99 weight percent of the (meth)acrylamide or the substituted (meth)acrylamide monomer.

The vinylamide polymer or the polyvinylamide adduct is linear, crosslinked, chain-transferred, or crosslinked and chain-transferred. The vinylamide polymer or the polyvinylamide adduct can be crosslinked using at least a difunctional monomer selected from the group consisting of methylene bis(meth)acrylamide, triallylammonium chloride, tetraallyl ammonium chloride, polyethyleneglycol diacrylate, polyethyleneglycol dimethacrylate, N-vinyl acrylamide, divinylbenzene, tetra(ethyleneglycol)diacrylate, dimethylallylaminoethylacrylate ammonium chloride, sodium salt of diallyloxyacetic acid, diallyloctylamide, trimethyllpropane ethoxylate triacryalte, N-allylacrylamide, N-methylallylacrylamide, pentaerythritol triacrylate, and combinations thereof.

The vinylamide polymer can be a copolymer of (meth) acrylamide and diallyldimethylammonium halide.

The vinylamide polymer can have an average molecular weight of about 500 to about 5,000,000 Daltons, or 2500 to about 5,000,000 Daltons. The vinylamide polymer can also have an average molecular weight of at least about 10,000 to about 1,000,000 Daltons; at least about between 30,000 to about 750,000 Daltons; at least about between 50,000 to about 750,000 Daltons; or at least about between 75,000 to about 600,000 Daltons.

Adduct formation can be monitored by measuring a change in turbidity or viscosity of the aqueous reaction, wherein the change in turbidity or viscosity is the difference in turbidity or viscosity of the aqueous reaction at the start of the reaction and at a predetermined endpoint.

The vinylamide polymer concentration can be less than about 4 weight % of the total reaction mixture, and the vinylamide polymer can have an average molecular weight of about 30,000 to about 1,000,000 Daltons. The vinylamide polymer concentration can also be less than about 2.5 weight % of the total reaction mixture, and the vinylamide polymer can have an average molecular weight of about 100,000 to about 1,500,000 Daltons.

The adduct can be characterized by a turbidity of 0.5 to 500 NTU (nephelometric units).

The adduct can be characterized by a turbidity of 0.5 to 200 NTU (nephelometric units).

The present disclosure is also directed to a cellulose reactive functionalized polyvinylamide adduct obtained by the process according to the present method.

The present disclosure is further directed to a paper or a board comprising a cellulose reactive functionalized polyvinylamide adduct obtained by the present method.

BRIEF DESCRIPTION OF THE FIGURES

For the purpose of illustrating the methods disclosed herein, there are depicted in the drawings certain embodiments. However, the methods and related products are not limited to the precise arrangements and instrumentalities of the embodiments depicted in the drawings.

DETAILED DESCRIPTION

Definitions of Basic Terms

Figure 1:
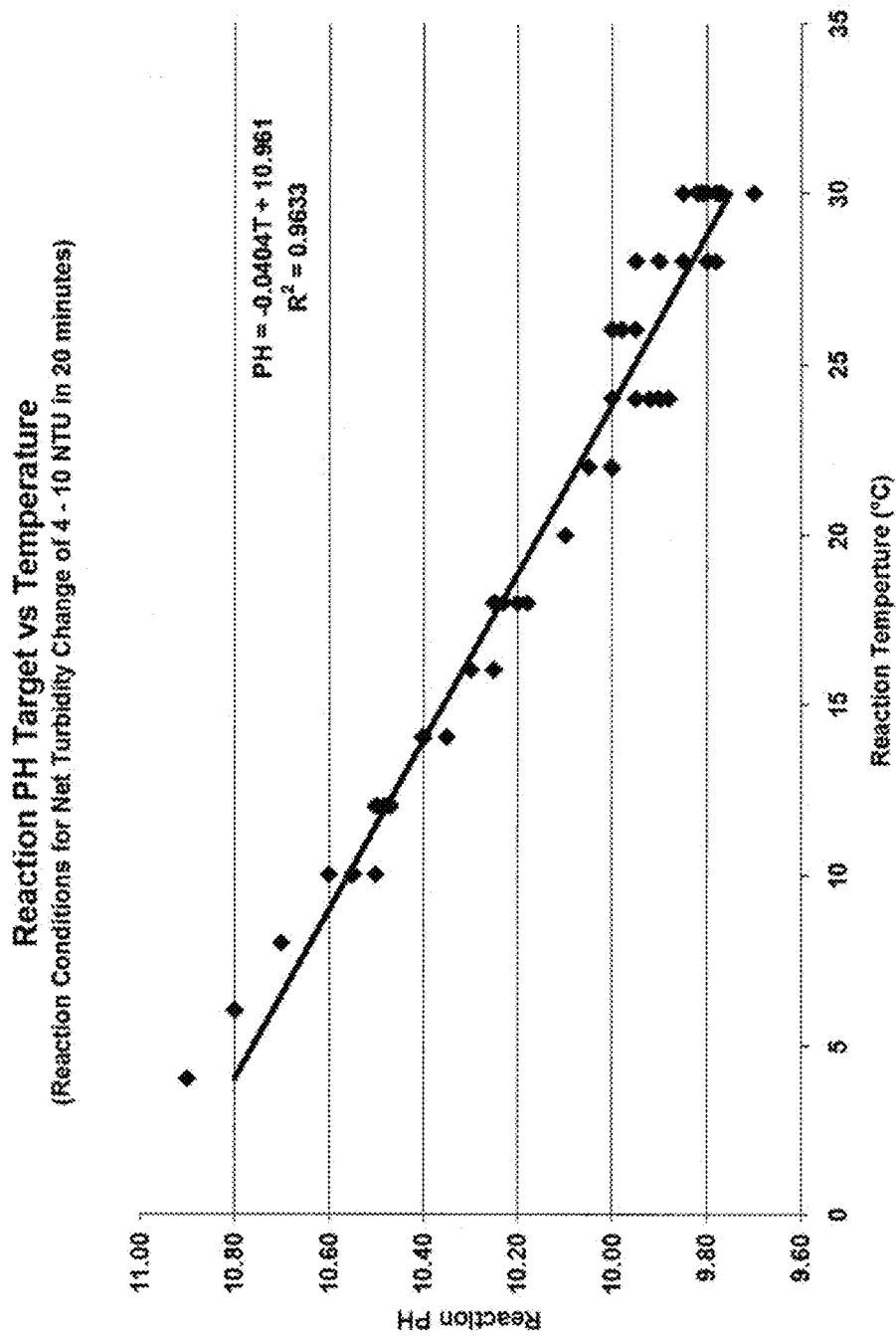
FIG. 1 is a bar graph illustrating a linear relationship between reaction pH Set Point and reaction temperature. The figure is based on data obtained from experiments described in Example 2.

The articles "a" and "an" are used herein to refer to one or to more than one (i.e., to at least one) of the grammatical object of the article. By way of example, "an element" means one element or more than one element.

The term "about" will be understood by persons of ordinary skill in the art and will vary to some extent depending on the context in which it is used. As used herein, "about" is meant to encompass variations of ±5%, ±1%, and ±0.1%.

It is understood that any and all whole or partial integers between any ranges set forth herein are contemplated with the range set forth.

For the purposes of this disclosure, the product of the methods for preparing a cellulose reactive functionalized polyvinylamide adduct comprising reacting a substantially aqueous reaction mixture of vinylamide polymer and a cellulose reactive agent is referred to interchangeably as "adduct", "formed adduct", or "cellulose reactive functionalized polyvinylamide adduct."

Furthermore, the reaction of the pendant amide groups of vinylamide polymers with glyoxal (a type of a cellulose reactive agent) is referred to as a "glyoxalation reaction" or simply "glyoxalation." The product of the glyoxalation reaction is referred to interchangeably as "glyoxalated-polyvinylamide" or "glyoxalated-polyvinylamide adduct."

The term "vinylamide" refers to any vinyl monomer containing an amide functionality including but not limited to acrylamide, methacrylamide, N-methyl acrylamide, or any other substituted acrylamide.

The term "copolymer" refers to a polymer formed from two or more monomers.

The term "starting vinylamide polymer" or "backbone vinylamide polymer" refers to a polymer of vinyl monomers (also known as "vinylamide polymer") used in the preparation of a cellulose reactive functionalized polyvinylamide adduct.

The starting vinylamide polymer may be a homopolymer, copolymer, or terpolymer. The starting vinylamide polymer may be cationic, potentially cationic, anionic, potentially anionic, nonionic, or amphoteric. The starting vinylamide polymer may also be a blend of vinylamide polymer and another water-miscible non-vinylamide polymer.

The term "adduct formation" refers to the adduct resulting from reacting a substantially aqueous reaction mixture of vinylamide polymer and a cellulose reactive agent.

The term "catalyzed adduct formation" refers to adduct formation carried out in an environment such that physical or chemical conditions cause the reaction to progress at a moderate to accelerated rate, wherein the desired reaction is obtained in less than about 12 hours, in less than 6 hours, less than 3 hours, less than about 1 hour, or less than 10 minutes. Adduct formation may occur under alkaline conditions or by addition of a base or basic buffer.

The term "substantially aqueous reaction mixture" refers to adduct formation carried out under conditions where the presence of organic oils does not exceed the weight of vinylamide polymer. For instance, adduct formation may be carried out under conditions where the total weight of the organic oils is less than 50 wt. % of the vinylamide polymer, is less than about 20 wt. % of the vinylamide polymer, less than 10 wt. % of the vinylamide polymer, less than about 5 wt. % of the vinylamide polymer, or less than about 1 wt. % of the vinylamide polymer. Alternatively, adduct formation may be carried out under conditions where there is no amount of oil is added during the adduct formation.

The "wt. % of the vinylamide polymer" is defined as follows:

$$\text{wt. \% of the vinylamide polymer} = \frac{\text{mass of the vinylamide polymer}}{\text{mass of the reaction mixture (including solvents)}} \quad \text{Eq. 2}$$

"Wt. % glyoxal consumed" is based on total weight of glyoxal charged.

"Molecular weight" refers to the mean weight average molecular weight (Mw). Molecular weight can be determined by standard methods such as GPC. For example, the average molecular weight may be determined by conventional calibration techniques using acetate buffer and the following columns: TSK PWXL (Guard+G6000+G3000). Polyethylene oxide and polyethylene glycol standards may be used to calibrate the column set.

The term "the concentration of vinylamide polymer" refers to the concentration of the starting polymer before reaction with the cellulose reactive agent, or adduct formation.

The term "incoming water" refers to water that is used as solvent and/or reaction medium during adduct formation.

The term "reaction pH set point" refers to the pH of the aqueous reaction solution during the reaction between vinylamide polymer and cellulose reactive agent.

The term "cellulose reactive agent" refers to a compound that contains two or more functional groups capable of forming covalent bonds with cellulose, for example, dialdehydes and, more specifically, glyoxal or gluteraldehyde.

As used herein, the term (meth)acrylamides includes both acrylamide and methacrylamide.

The term "self-substantive" refers to the property of having affinity for cellulose fibers. For instance, a vinylamide copolymer that is self-substantive has natural affinity for cellulose fibers. When these copolymers are put into aqueous solution with fibers, there will be an electrostatic attraction between the cationic polymer and the anionic cellulose fibers, resulting in "retention" of the polymer chains on the fibers.

The term "constant reaction rate" refers to the reaction rate of a glyoxalation reaction between a polyvinylamide and a cellulose reactive agent when carried out in a continuous manner. The reaction rate is a function of reaction time and reaction extent, where the reaction extent is defined as the proportion of the cellulose reactive agent consumed during the reaction, i.e., 50% for example. A "constant reaction rate" has been established when both the reaction time and the reaction extent remains unchanged over a given period of time.

Further definitions may be found in the following description.

DESCRIPTION

Provided is a method for functionalizing polyvinylamide polymers with dialdehydes in dilute aqueous solution in a continuous process. Certain control parameters have been discovered which allow the process of this disclosure to produce a constant and consistent final product while certain reaction parameters, such as solution temperature, solution pH and reaction time and/or volume vary according to the prevailing ambient conditions and instantaneous volume demand for the final adduct. As demonstrated herein for a particular polyvinylamide polymer with a particular dialdehyde, the reaction kinetics have been studied, and have been discovered to fit a mathematical formula that defines the reaction rate. The discovery advantageously allows production of the final glyoxalated-polyvinylamide adduct in instantaneously varying quantities without the need to use a buffering storage tank to hold an excess quantity of the final adduct.

The disclosed method offers unexpected advantages over batch processes and conventional continuous processes. For example, the reaction solution temperature and the required reaction time can be automatically measured and used to calculate the solution pH required to maintain a constant quality of final adduct, using the mathematical equation disclosed, and thereby produce a constant quality of final adduct. In contrast, a batch process or a conventional continuous process needs to be shut down and recalibrated to accommodate the changing temperature of the incoming water supply (e.g., where municipal water is used). Process shut-downs result in the loss of productivity and therefore increased costs for modifying the process to accommodate an increase or decrease in the temperature of the incoming water.

As envisioned in the present disclosure with respect to the disclosed methods and compositions of matter, in one aspect the embodiments comprise the components and/or steps disclosed therein. In another aspect, the embodiments consist essentially of the components and/or steps disclosed therein. In yet another aspect, the embodiments consist of the components and/or steps disclosed therein.

I. Process Reactants and Optional Addition Components
IA. Starting Vinylamide Polymer
Molecular Weight, Structure and Composition of Vinylamide Polymer The vinylamide polymers that are used in adduct formation (such as glyoxalation) can be of any molecular weight obtainable by methods of polymer synthesis known to those skilled in the art. The vinylamide polymer may be nonionic, cationic, anionic, or amphoteric. The vinylamide polymer may be crosslinked or structured.

The starting vinylamide polymer has an average molecular weight of at least 500. The average molecular weight of the vinylamide polymer may range from at least 500 to about 5,000,000 or even 10,000,000 Daltons. The starting vinylamide polymer may be at least about 10,000 to about 5,000,000. For example, a starting vinylamide polymer with an average molecular weight of about 30,000 to 2,000,000, or about 70,000 to 1,000,000 is envisioned. The process of the disclosure includes adduct formation using vinylamide polymers of about 50,000 or greater, about 70,000 or greater and even about 85,000 or 100,000 or greater. Average molecular weight ranges of the starting vinylamide polymer include between 5,000 to about 150,000; 10,000 to about 150,000; or 25,000 to about 150,000. The vinylamide polymer can also have an average molecular weight of at least about 10,000 to about 1,000,000 Daltons; at least about between 30,000 to about 750,000 Daltons; or at least about between 50,000 to about 750,000 Daltons; or at least about between 75,000 to about 600,000 Daltons; or at least about 50,000 to about 1,000,000 Daltons.

Suitable vinylamide monomers include (meth)acrylamide, $C_{1-4}$ mono substituted (meth)acrylamide, such as N-methyl (meth)acrylamide and N-ethyl(meth)acrylamide. In some embodiments, the vinylamide monomers are acrylamide and methacrylamide.

The vinylamide content of the polymers of the present disclosure provides the sites to which substituents of the cellulose reactive agent (for example, glyoxal substituents) are attached. The minimum proportion of vinylamide units that should be present in the vinylamide polymer should be sufficient so that the resulting adduct is thermosetting, such that the adduct forms a water-insoluble film when it is laid down from water solution on a glass plate and heated for 5 minutes at about 105° C.

The starting vinylamide polymer (prior to adduct formation) may be prepared using at least about 10 wt. % vinylamide monomers. For instance, the starting vinylamide polymer may be formed from at least about 20 to about 100 wt. % vinylamide monomers. Alternatively, the starting vinylamide polymer may be formed from at least about 20 to about 99 wt % vinylamide monomer, at least about 25 to about 90 wt. % vinylamide monomer, or at least about 50 wt. % vinylamide monomer, or at least about 70 wt % vinylamide monomer. The wt. % vinylamide monomer is based on the weight of the total weight of monomers charged to form the vinylamide polymer. Once the monomers polymerize, they become incorporated units in the polymer.

Thus, there may be units in the polymers of the present disclosure, which may confer ionic properties upon the polymer, or those which act as diluents or spacers, or which confer particular properties, for example, improved or diminished water-solubility.

Ionic co-monomers, which can be used in conjunction with vinylamide monomers, can be cationic, potentially cationic, anionic, potentially anionic, or amphoteric. When using cationic co-monomers, one or more cationic monomers can be used, and the total amount of cationic monomer should be such that an adduct of the vinylamide copolymer is self-substantive cellulose fibers in aqueous suspension.

Cationic co-monomers may be used to impart substantivity to cellulose fiber. The term "substantivity" means that there is an inherent attraction between the copolymers and the fibers, and that no additional additive is needed to facilitate the attraction.

Suitable cationic monomers or potentially cationic monomers include diallyldialkyl amines, 2-vinylpyridine, 2-(dialkylamino)alkyl(meth)acrylates, and dialkylamino alkyl (meth)acrylamides, and acid addition and quaternary ammonium salts thereof. Exemplary cationic monomers or potentially cationic monomers include diallyldimethyl ammonium chloride, (meth)acryloyloxy ethyl trimethylammonium chloride (dimethyl amino ethyl(meth)acrylate, methyl chloride quaternary salt), 2-vinyl-N-methylpyridinium chloride, (p-vinylphenyl)-trimethylammonium chloride, (meth)acrylate 2-ethyltrimethylammonium chloride, 1-methacryloyl-4-methyl piperazine, Mannich poly acrylamides (i.e., polyacrylamide reacted with dimethyl amine formaldehyde adduct to give N-(dimethyl amino methyl), and (meth)acrylamido propyltrimethyl ammonium chloride).

Potentially cationic monomers may be, for example, monomers that give a cationic charge under acidic conditions such as when amine functionality on the potentially cationic monomer is protonated.

The amount of cationic co-monomer may range from about 0% to about 90 wt. %, about 0.1 to about 80 wt %, about 0.1 to about 40, about 0.1 to about 30, about 0.1 to about 25 wt % or about 0.1 to about 15 or about 10 wt. %. The wt. % of cationic co-monomer is based on the total weight of monomer(s) charged to form the vinylamide polymer.

Furthermore, the vinylamide monomers may be copolymerized with vinyl tertiary amines such as dimethylaminoethyl acrylate or vinylpyridine. The tertiary amine groups can then be converted into quaternary ammonium groups by reaction with methyl chloride, dimethyl sulfate, or benzyl chloride to produce a cationic polymer. Moreover, polyacrylamide can be rendered partially cationic by reaction with glycidyl dimethyl ammonium chloride.

Suitable anionic monomers include vinyl acidic materials such as acrylic acid, methacrylic acid, maleic acid, allyl sulfonic acid, vinyl sulfonic acid, itaconic acid, fumaric acid, potentially anionic monomers (such as maleic anhydride and itaconic anhydride and their alkali metal and ammonium salts), 2-acrylamido-2-methyl-propanesulfbnic acid and its salts, and sodium styrene sulfonate. Alternatively, if the starting vinylamide polymer is polyacrylamide, it may be partially hydrolyzed to achieve some anionic character then functionalized with the cellulose reactive agent.

Potentially anionic monomers may be, for example, acrylamide, which, when partially hydrolyzed, forms an acid which may give anionic character to the polymer under basic conditions. Alternatively, the potentially anionic monomers may be, for instance, an anhydride monomer, such as maleic anhydride or itaconic anhydride, which can be hydrolyzed to form the corresponding acid.

The starting vinylamide polymer may be amphoteric. Specifically, the starting vinylamide polymer may include anionic and cationic functionality. The amphoteric starting vinylamide polymer may be formed from both anionic and cationic monomers, or may alternatively be formed from zwitterionic monomers. Various anionic, cationic, and/or zwitterionic monomers may be reacted in any weight ratio to form the amphoteric starting vinylamide polymer. The predominate charge on the formed amphoteric vinylamide polymer may be cationic. Thus, the mole % of cationic monomer dominates over the mole % anionic monomer incorporated into the amphoteric vinylamide polymer.

Suitable non-ionic monomers other than the vinylamide may be selected from the group consisting of (meth)acrylic esters such as (octadecyl(meth)acrylate, ethyl acrylate, butyl acrylate, methylmethacrylate, hydroxyethyl(meth)acrylate and 2-ethylhexylacrylate), N-alkyl acrylamides, N-octyl (meth)acrylamide, N-tert-butyl acrylamide, N-vinylpyrrolidone, N,N-dialkyl(meth)acrylamides (such as N,N'-dimethyl acrylamide), styrene, vinyl acetate, hydroxy alkyl acrylates, and methacrylate (such as 2-hydroxy ethyl acrylate and acrylonitrile).

The starting vinylamide polymer may be crosslinked, branched or otherwise structured or linear. For example, the starting vinylamide polymer may be linear, chain-transferred, or crosslinked and chain-transferred (i.e., structured).

Cross linking agents that may be used include polyethylenically unsaturated crosslinking agents. Non-limiting examples of cross linking agents are methylene bis(meth) acrylamide, triallylammonium chloride, tetraallyl ammonium chloride, polyethyleneglycol diacrylate, polyethyleneglycol dimethacrylate, N-vinyl acrylamide, divinylbenzene, tetra(ethyleneglycol)diacrylate, dimethylallylaminoethylacrylate ammonium chloride; diallyloxyacetic acid, Na salts, diallyloctylamide, trimethyllpropane ethoxylate triacryalte, N-allylacrylamide N-methylallylacrylamide, pentaerythritol triacrylate, and combinations thereof. Other systems for crosslinking can be used instead of, or in addition to these cross linking agents. For instance covalent crosslinking through pendant groups can be achieved by the use of ethylenically unsaturated epoxy or silane monomers, or by the use of polyfunctional crosslinking agents such as silanes, epoxies, polyvalent metal compounds, or other known crosslinking systems.

Synthesis of Backbone Vinylamide Polymer or Starting Vinylamide Polymer

The backbone vinylamide polymers, which are used to prepare the adduct, may be synthesized by free radical or redox catalysis polymerization of a vinylamide monomer, and optionally one or more ionic co-monomer(s) or nonionic co-monomers. Cross-linking agents with multiple polymerizable vinyl functionalities can also be included in the formulations to impart structure to the backbone polymer. A chain transfer agent, such as sodium hypophosphite, may be used to control the molecular weight of the polymer molecules, as well as to introduce branching.

A water soluble starting vinylamide polymer may be formed by any suitable polymerization process. For instance, the starting vinylamide polymer may be prepared as gel polymers by solution polymerization, water-in-oil suspension polymerization or by water-in-oil emulsion polymerization. The starting vinylamide polymer may also be produced as beads by suspension polymerization or as a water-in-oil emulsion or dispersion by water-in-oil emulsion polymerization, for example according to the process set forth in EP-A-150933, EP-A-102760, or EP-A-126528.

Alternatively the water soluble polymer may be provided as a dispersion in an aqueous medium. This may, for instance, be a dispersion of polymer particles of at least microns in an aqueous medium containing an equilibrating agent as given in EP-A-170394. This may, for example, also include aqueous dispersions of polymer particles prepared by the polymerization of aqueous monomers in the presence of an aqueous medium containing dissolved low intrinsic viscosity polymers such as poly diallyl dimethyl ammonium chloride and optionally other dissolved materials, for instance, electrolyte and/or multi-hydroxy compounds, e.g., polyalkylene glycols, as given in WO-A-9831749 or WO-A-9831748.

Chain transfer agents may be used to synthesize the starting vinylamide polymer. Suitable chain transfer agents include, but are not limited to 2-mercaptoethanol; low molecular weight organic acids such as lactic acid, formic acid, malic acid, or butyric acid; isopropyl alcohol; thioacids and hypophosphites.

IB. Cellulose Reactive Agent

The cellulose reactive agent will comprise more than one aldehyde functionality.

Exemplary cellulose reactive reagents include glyoxal, glutaraldehyde, furan dialdehyde, 2-hyroxyadipaldehyde, succinaldehyde, dialdehyde starch, diepoxy compounds, and combinations thereof.

The molar ratio of amide (on the vinylamide polymer) to cellulose reactive agent may vary from about 12:1 to about 2:1, for example, about 10:1 to about 2.5:1, about 10:1 to about 1:1, about 6:1 to about 2.5:1 and about 6:1 to about 3:1, and integer values there between.

The molar content of amide on the vinylamide polymer may be determined experimentally by methods well known in the art or calculated from the known monomer composition.

IC. Optional Additional Components in Reaction Mixture

Conventional additives which may be added to the adduct formation reaction are chelating agents to remove polymerization inhibitors, pH adjusters, initiators, buffers, surfactants, and other conventional additives.

Other materials which are soluble or miscible in water may additionally be present in the reaction mixture. Chelating agents, electrolytes such as sodium chloride, surfactant, and polar solvents such as methanol may be present in the reaction mixture. Low molecular weight cationic polymers such as polysaccharides, polydiallyldimethylammonium chloride (polyDADMAC), and polyamines. Inorganic cationic flocculants may also be present, such as ferric chloride, aluminum sulfate, polyaluminum chloride, and aluminum chlorohydrate, etc., may be present in the reaction mixture.

The vinylamide polymer or formed adduct may be further combined with a second polymer (different than the vinylamide polymer), which may be cationic, anionic, non-ionic or amphoteric. For example the glyoxalated polyvinylamide polymer may be combined with a polyamine or polyaminopolyamide epichlorohydrin (PAE), polyvinylamine.

Furthermore, the second polymer may be cationic, or may be formed from cationic or potentially cationic monomers, such as those described herein. The second polymer may be a Mannich base, polyamine, polyethyleneimine, polyamidoamine/epichlorohydrins, polyamine epichlorohydrin products, dicyandiamide polymers (including polyamine-dicyandiamide and polydicyandiamide formaldehyde polymers), or cationic starch. Additional examples of the second polymer may include polyamine-epihalohydrin resins, such as polyaminopolyamide-epihalohydrin resins, which may be cationic thermosetting materials used to increase the wet strength of papers.

II. Reaction Conditions

IIA. Base Addition

Preparation of the cellulose reactive functionalized polyvinylamide adduct may be catalyzed by a basic pH. A pH range of about 8.5 to about 12 is generally considered to be a catalytic environment for the reaction. A concentrated pH buffer solution may be added to the reaction to maintain pH in the desired catalytic range.

IIB. Concentration of the Vinylamide Polymer

As discussed above, "the concentration of vinylamide polymer" refers to the concentration of the starting polymer before reaction with the cellulose reactive agent or adduct formation.

One advantage stemming from the process of the disclosure is that cellulose reactive adducts can be formed from starting vinylamide polymers of significantly higher Mw than those adducts enabled by the processes of the prior art. This process enables the use of vinylamide polymers of any Mw, so long as the concentration of the vinylamide polymer is at or below its own critical concentration during the reaction between that polymer and the cellulose reactive agent.

A "Critical Concentration" exists for any given vinylamide polymer, and the Critical Concentration of a vinylamide polymer coincides with an inflection point in the rheological behavior of a solution of that vinylamide polymer during the adduct formation reaction. This rheological inflection point can be defined as the point on a plot of vinylamide polymer concentration versus change in reaction mixture viscosity resulting from adduct formation. The inflection point, and therefore the Critical Concentration, is the theoretical point at which the slope of the plot line reverses direction.

The Critical Concentration for adduct formation using a vinylamide polymer may be determined through empirical studies involving a vinylamide polymer with one or more cellulose reactive agents. Multiple reactions of the vinylamide polymer with one or more cellulose reactive agents should be carried out in a number of independent reaction solutions, wherein each solution has a known and different vinylamide polymer concentration which is expressed as a wt. % of the total reaction mixture. The rheological behavior or change in viscosity of a reaction mixture is measured as adduct formation proceeds, and this change in viscosity can be either a continued increase in viscosity or a continued decrease in viscosity as the reaction proceeds, or even no statistically significant change in viscosity as the reaction proceeds. If the viscosity trend increases as the reaction proceeds, then the concentration of vinylamide polymer in the reaction mixture is said to be above the Critical Concentration for that vinylamide polymer. If the viscosity trend decreases as the reaction proceeds, then the concentration of the vinylamide polymer in the reaction mixture is below the Critical Concentration for that vinylamide polymer. If no statistically significant change in viscosity is measured as the reaction proceeds, then the concentration of vinylamide polymer in the reaction solution is at or very near the Critical Concentration of that vinylamide polymer.

When attempting to ascertain an empirically derived value of the Critical Concentration of a particular vinylamide polymer, it is helpful for an experimenter to understand that the magnitude of the viscosity change versus reaction extent of various reaction mixtures decrease as the actual vinylamide polymer concentrations become more proximate to the theoretical Critical Concentration for that particular vinylamide polymer.

The Critical Concentration of a particular vinylamide polymer is strongly influenced by the vinylamide polymer molecular weight, and is therefore specific for vinylamide polymers with specific molecular weights, and with other equivalent characteristics. Other factors including but not limited to cross-linking, branching or other structuring, monomer composition, polymer ionicity and reaction solution ionic strength also affect the Critical Concentration. However, molecular weight has by far the most profound impact on the value of the Critical Concentration. When considering a specific vinylamide polymer composition with all variables held constant except for molecular weight, the plot of the reaction mixture vinylamide polymer concentration versus molecular weight depicts an inversely proportional relationship between molecular weight and Critical Concentration. As the molecular weight of vinylamide polymers is increased, the value of the Critical Concentration decreases.

The Critical Concentration can therefore vary considerably between vinylamide polymers of differing average molecular weights. For example, the Critical Concentration may vary from 0.2% to about 4.5 wt. % of the vinylamide polymer, about 0.3 wt. % to less than 4.0 wt. %, about 0.5 to about 3.5 or 1.0 to about 3.0 or about 1.5 to about 2.5 wt. % of the vinylamide polymer. Vinylamide polymers with the highest efficiency for developing strength in paper have been found to have Critical Concentrations in the range of about 1.0% to about 3.0%.

As an example of how the Critical Concentration varies with the weight average molecular weight of vinylamide polymers, and considering specific vinylamide polymers composed of 90 weight percent acrylamide and 10 weight percent diallyldimethylammonium chloride (DADMAC), and with no compounds present in the reaction mixture other than the vinylamide polymer, glyoxal, deionized water and a catalytic quantity of sodium hydroxide; a polymer with a Mw of approximately 4,000,000 has a Critical Concentration of about 0.35 wt. % of the reaction mixture, and a polymer with a Mw of approximately 13,000 has a Critical Concentration of about 3.5 wt. % of the reaction mixture.

Compositional and process related advantages have been found when adduct formation occurs at or below the Critical Concentration. It is also possible to realize the advantages of the process when the vinylamide polymer concentration is slightly above the Critical Concentration. For example, the concentration can be about 1 percentage points above the Critical Concentration and the adduct produced will benefit from more efficient consumption of the cellulose reactive agent reactant and better performance on paper, when compared to those adducts produced at higher concentrations known previously (typically 8 to 12 wt. %).

Another advantage of the process is the ability to form adducts using relatively high average molecular weight vinylamide polymer without premature gelling of the glyoxalated adduct. For example, most of literature exemplifies glyoxalation reactions wherein the starting vinylamide polymer has an average molecular weight ranging from 5,000 to about 10,000 at concentrations of vinylamide polymer that range from 8 to 12 wt. %. At these concentrations (8-12 wt. %), the glyoxalation reaction of a relatively high molecular weight of the starting vinylamide polymer (=>25,000) will prematurely gel causing incomplete glyoxalation of the starting polymer and generating an insoluble gel. The present disclosure provides a solution to this problem that enables glyoxalation of a relatively high molecular weight (=>25,000) starting polyvinylamide which yields an adduct that in turn gives better performance on paper or board.

For instance, subjecting various samples of the adduct to conditions that break aldehyde-amide bonds allows one to determine the Mw of the starting or "backbone" polymer. This can be done by subjecting the adduct to basic conditions for a period of time.

The concentration of the vinylamide polymer may vary considerably, for example, in the following manner: less than 4 wt. %, about 0.1 to less than 4, less than 3.5, 0.5 to about 3.5 wt. % vinylamide polymer, about 1.0 to about 3.5 or 1.0 to about 3.0 or about 1.5 to about 3.0 wt. % vinylamide polymer.

Furthermore, it has been discovered that the Critical Concentration of the vinylamide polymer is generally at or less than 5.0 weight percent vinylamide polymer based on the total weight of glyoxalation reaction solution when the molecular weight is above 2,000.

For instance, a vinylamide polymer of molecular weight ranging from about 1,000,000 to about 4,000,000 gives a Critical Concentration, which varies from 1.0 to about 0.2 wt. %; a vinylamide polymer of molecular weight ranging from about 25,000 to about 175,000 will show a concentration which varies from about 2.5 to about 1.1 wt. %; and a vinylamide polymer of molecular weight ranging from a molecular weight ranging from about 2,000 to about 15,000 will show a concentration which varies from about 5.0 to about 3.5 wt. %.

IIC. Percent Glyoxal Consumed

Traditionally, processes which are run in substantially aqueous environments have not been able to achieve efficient use of the glyoxal reactant, and typically consume less than 50 wt. % of the total glyoxal charged.

The glyoxal consumed in the described methods may be determined by measuring the residual glyoxal (unbound glyoxal) remaining in the glyoxalation reaction mixture. The reaction is continued until at least about 15 wt. % of the total glyoxal has been consumed, and the reaction may also be usefully continued until as much as 90 or more weight % of the total glyoxal is consumed in the reaction. The method of analysis is described in the Examples section.

Furthermore, a procedure for determining the amount of bound cellulose reactive agent in the adduct can be found in R. E. J. Mitchel, H. C. Birnboim, *The use of Girard-T reagent in a rapid and sensitive method for measuring glyoxal and certain other α-dicarbonyl compounds*, Analytical Biochemistry 81(1): 47-56 (1977).

Consumption of the cellulose reactive agent may be at least about 10 wt. %, or even at least 20, 40, 60, 65, 75, 85 or 90 wt. % of cellulose reactive agent during adduct formation.

Reactant cellulose reactive agent (such as glyoxal) is the amount of total cellulose reactive agent charged before, during or after the adduct formation reaction.

Cellulose reactive agent (such as glyoxal) is charged in any number of increments before and/or during the reaction.

IID. Monitoring of Adduct Formation

Traditionally, adduct formation between vinylamide polymer and a cellulose reactive agent, such as glyoxal, is monitored by measuring the viscosity of the reaction over time. Once a certain increase in viscosity is achieved for a particular vinylamide polymer, the reaction is quenched by dilution and/or addition of acid.

In contrast, the disclosed adduct formation shows only a very moderate increase in viscosity, a slight decrease in viscosity, or no increase at all. It was observed for the method disclosed herein that as the glyoxalation of the vinylamide polymer proceeds, the turbidity of the reaction solution increases. Thus, the adduct formation method may be monitored using a turbidimeter or a viscometer.

Therefore, adduct formation may be determined by measuring the change in turbidity or viscosity of the aqueous reaction at the start of the reaction or $T_0$ and at a predetermined endpoint $T_e$ ($T_e$-$T_0$). The predetermined endpoint is, for example, a desired increase in turbidity (measure of glyoxalation) for a particular vinylamide polymer. Thus, for example, a vinylamide polymer of 100,000 average molecular weight may give a turbidity of 0 to 5 NTU (nephelometric units) at the beginning of the reaction ($T_0$) and a turbidity change of between 0.5 to 500 NTU at the predetermined endpoint. Once the turbidity of the reaction mixture has increase by about 0.5 to 500 NTUs, the reaction can be quenched to prevent further reaction, or the adduct can be used in a papermaking process without the addition of an acid.

Turbidity measurements can be useful to monitor adduct formation when the reaction takes place at or below the Critical Concentration.

Turbidity can be measured using turbidimeters are known in the art. For example SURFACE SCATTER 7SC turbidimeter is a continuous-monitoring instrument designed for measuring turbidity in fluids. The instrument design is based on the nephelometric principle, where light scattered by particles suspended in the fluid is measured to determine the relative amount of particulate matter in the fluid.

Where a viscosity change occurs (increase or decrease) during adduct formation, the extent of reaction may be monitored by the change in viscosity. Viscosity can be measured using viscometers are known in the art. Viscosity typically can be measured during the reaction using the UL adapter for a BROOKFIELD LV series viscometer. The UL adapter has no spindle number. Only one setting is possible. The base of the adapter cup is removed and the assembly is placed directly into the reaction mixture. Viscosity measurements can be automatically recorded every second during the length of the catalyzed reaction. The viscometer is set to a speed of 60 rpm and the temperature of the reaction mixture is maintained at about 25° C.

The adduct is prepared in a continuous mode, wherein one or more of the reaction parameters is automatically recalibrated as needed to maintain a constant reaction rate. For instance, the continuous process may be programmed so the temperature of incoming water is monitored and the pH of the reaction mixture of the continuous process may be adjusted based on the following equation (see Example 2 and FIG. 1):

$$pH = -0.0404T + 10.961 \qquad \text{Eq. 1}$$

Where: pH=reaction pH Set Point
T=reaction Temperature (° C.)

The process of the present disclosure may include a method comprising reacting a substantially aqueous reaction mixture of a vinylamide polymer and a cellulose reactive agent at a temperature of about 1° C. to about 60° C. and a reaction pH set point of about 8.5 to about 12, for about 1 minutes to about 300 minutes, wherein:
i) the temperature of incoming water is measured;
ii) the pH of the reaction mixture is adjusted to maintain an approximately constant reaction rate (see e.g., Example 2 and FIG. 1);
iii) between 10%0/and 90% of the cellulose reactive agent is consumed, and the molar ratio of the amide functionality on the vinylamide polymer to cellulose reactive agent is between 10 to 1 and 1 to 1; and
iv) the concentration of the vinylamide polymer prior to and during formation of the adduct is about 0.25-15% of the total reaction mixture, thereby forming the adduct.

The process of the present disclosure is particularly favorable for implementation in a continuous reactor with pH measurement capability at the papermaking site.

The continuous process may also be programmed such that the temperature of incoming water is monitored and the reaction time of adduct formation is varied while keeping the pH constant. The pH may be kept constant using a buffer that maintains the reaction at a high pH, i.e., a pH of about 10 to about 11. This is an improvement over known methods where storing the adduct at high pH shortened the shelf life of the adduct because the aldehyde functional groups of the adduct would be hydrolyzed. It was surprisingly found that the adduct formed at high pH from the disclosed process can be stored for a longer time than adduct formed from traditional methods.

Other variables which affect the rate of glyoxalation include, but are not limited to, temperature, vinylamide polymer molecular weight, reaction mixture concentration, molar ratio between vinylamide polymer and glyoxal, molar amide constituency of the vinylamide polymer, and the presence of substances which interfere with the reaction.

The reaction may be run at ambient temperatures. The reaction may also be carried out over a wide temperature range. For instance, the reaction may be carried out at a temperature of about 1° C. to about 65° C.

Adduct formation may be carried out for about 2 minutes to about 200 minutes. Furthermore, adduct formation may be run at the concentration of the vinylamide polymer is 0.5-20%.

III. Applications of Vinylamide Polymer Adduct

The adduct may be used in the manufacture of paper as dilute aqueous solutions. The aqueous solutions can be applied to preformed paper by the tub or impregnation method, or by adding the solutions directly to paper-making fibrous suspensions, such as an aqueous cellulosic slurry, at any point in the paper-making process where wet- and dry-strength resins are ordinarily applied.

The cellulose reactive polyvinylamide adducts may be applied or incorporated in the wet-end of the papermaking process or applied to the wet paper.

The adduct may be added in the thick or thin stock. When added to the thin stock, it may be added before the fan pump.

A substantial amount of wet- or dry-strength is imparted when as little as about 0.05 wt. % of the adduct, based on dry fiber weight of the furnish is added to the furnish.

For example, dosages of about 0.1 to about 20 (0.05-10 kg/metric ton) pounds dry polymer per ton of dry furnish, about 1 to about 12, (0.5-6 kg/metric ton) about 1 to about 9 (0.5-4.5 kg/metric ton), about 1 to about 8 (0.5-4 kg/metric ton) pounds dry polymer per ton of dry furnish is envisioned. More typically ranges of 1.5 to about 6 (1.0-3 kg/metric ton) pounds dry polymer per ton of dry furnish are envisioned.

Application of the adduct to wet paper or board may be accomplished by any conventional means. Examples include but are not limited to size press, padding, spraying, immersing, printing, or curtain coating.

The adduct may be absorbed by the paper-making fibers at pH values ranging from about 3.5 to about 8.

The following examples describe certain embodiments, but the disclosed method is not limited thereto.

EXAMPLES

Example 1

Comparative Example of Glyoxalated Polyvinylamides Synthesized by the Process of the Invention and Alternatively by a Batch Process A vinylamide copolymer composed of 9 weight percent DADMAC and 91 weight percent acrylamide was synthesized by redox polymerization as an aqueous solution containing 30 percent polymer solids by weight, with a weight average molecular weight of 110,000. This polymer was used as the base polymer for the two comparative glyoxalation reactions, Reaction A and Reaction B, which follow.

Reaction A was run as a "batch" reaction at an ambient temperature of 21° C. The reaction solution for Reaction A was prepared by combining 28.33 grams of the 30% solids vinylamide base polymer, 5.0 grams of 40% aqueous glyoxal and 467.92 grams of deionized water to make a solution of 1.7 weight percent vinlyamide polymer and 0.4 weight percent glyoxal. The reaction solution was mixed to homogeneity by way of overhead mixing, and mixing was continued for the duration of the reaction. An aqueous solution of 5 weight percent sodium hydroxide was added dropwise to the reaction mixture until the pH reached 9.5, and was added intermittently to maintain the solution pH at 9.5 for the duration of the reaction. The initial turbidity of the reaction solution was measured once the reaction solution reached a pH of 9.5 and was recorded as T(i). The turbidity of the reaction solution was measured intermittently until the turbidity increased by 5 NTU above T(i). Once a 5 NTU increase in turbidity was achieved, a solution of 5 weight percent sulfuric acid was added dropwise to lower the pH of the solution to 3.5 to stop the forward progress of the reaction. A sample of the final product was collected and labeled as Product A.

Reaction B was run by the process of the present application at an ambient temperature of 22° C. A portion of the vinylamide base polymer was diluted to 2.21 percent solids with deionized water to make four liters of base polymer feed stock. A portion of 40% aqueous glyoxal was diluted to 1.88 percent glyoxal with deionized water to make one liter of glyoxal feed stock. A solution of 2.0 percent sodium hydroxide feed stock was made by diluting 50 percent aqueous sodium hydroxide solution with deionized water. A 16.5 meter section of 0.2 centimeter (inside diameter) polyurethane tubing was wound around a cylinder to function as a continuous tubular reactor. The base polymer feed stock and the glyoxal feed stock were pumped continuously by peristaltic pumps at feed rates of 2.0 and 0.55 milliliters per minute respectively, and the two flows were combined with a "Y" connector into a 50 centimeter section of 0.2 centimeter (ID) polyurethane tubing. The 2.0 percent sodium hydroxide feed stock was pumped continuously using a syringe pump at a flow rate of 0.03 to 0.06 milliliters per minute, and was combined with the base polymer and glyoxal feed stock flow using a separate "Y" connector, which combined the flows directly into the 16.5 meter section of reaction tubing. The reaction solution was sampled immediately following the combination of the three raw materials into one flow, and the turbidity of the solution was measured and recorded as the initial turbidity, T(i). With a combined flow rate of approximately 2.60 milliliters per minute, the 16.5 meter section of reaction tubing provided a residence, or reaction time of approximately 20 minutes, after which time material began to drip from the end of the tubing. The continuous reaction system was allowed to run for one hour to reach a steady state, after which time a sample of the material dripping from reaction tubing was collected and turbidity of the sample was measured and recorded as the final turbidity T(f). The sodium hydroxide feed rate was adjusted until such time as T(f)−T(i)=approximately 5 NTUs. A sample of material exiting the tubular reactor was collected and the pH of the reaction sample was lowered to 3.5 by the dropwise addition of 5% sulfuric acid solution. This sample was labeled as Product B.

Samples of Reaction mixtures A and B were collected just prior to the addition of the sodium hydroxide in each case and were analyzed for glyoxal concentration. The concentration of unreacted glyoxal remaining in Products A and B after completion of each reaction was also measured. The percentage of glyoxal consumed during each reaction is calculated from the "pre" and "post" reaction measurements. The data are depicted in Table 1.

TABLE 1

|  | Pre-reaction glyoxal | Post-reaction glyoxal | Percent unreacted glyoxal |
| --- | --- | --- | --- |
| Product A | 0.408% | 0.221% | 45.8% |
| Product B | 0.391% | 0.205% | 47.6% |

The efficiency of Sample A and Sample B as dry strength additives was evaluated in a hand sheet evaluation. An aqueous fiber slurry of 1.0% solids, wherein the solids were composed of 90 percent old corrugated containers and 10 percent mixed waste papers was used as the fiber substrate. The Canadian Standard Freeness (CSF) of the fiber slurry was adjusted to 350 by beating. Aliquots of Samples A and B were diluted to 0.25% solids for dosing to the fiber slurry. Aliquots of the fiber slurry, each containing approximately 3.0 grams of oven dry solids, were individually heated to 50 degrees Celsius and placed under overhead mixing. The diluted strength additive solutions were added to the heated aliquots of fiber slurry and mixed for twenty seconds. The treated slurry was then added to a 200 square centimeter hand sheet mold where it was mixed with additional dilution water. The fiber slurry in the sheet mold was then dewatered by gravity over a screen to form a wet fibrous mat, the mat was couched from the screen, pressed at 40 psi on a rolling nip press, and the pressed hand sheets were dried on a rotating drum dryer. The dried hand sheets weighed approximately 3.0 grams each, representing a basis weight of approximately 150 grams per square meter.

The finished hand sheets were tested for Ring Crush strength using a 17-76 Compression Tester from TESTING MACHINES INC. The Ring Crush results were indexed to basis weight. Specifically, the strength results for each sheet in kilonewtons (kN) were divided by the basis weight of each sheet in grams per square meter. The data are depicted in Table 2.

TABLE 2

| Experimental | | Product A | | Product B | |
|---|---|---|---|---|---|
| Condition | Blank | 3 lb/ton | 6 lb/ton | 3 lb/ton | 6 lb/ton |
| Ring Crush Index (Kn*m/g) | 0.0162 | 0.0166 | 0.0177 | 0.0174 | 0.0182 |
| Increase Above Blank (%) | N/A | 2.40% | 9.27% | 7.44% | 12.03% |

Example 2

Reaction Rate Control Independent of Temperature

A series of glyoxalation reactions was performed to determine the feasibility to overcome temperature-induced changes in glyoxalation reaction rate by manipulation of reaction solution pH. Specifically, the goal of this experiment was to determine if reaction rate could be held constant across a range of temperatures by predictive control of reaction solution pH.

For all reactions, the same starting vinylamide polymer from Example 1 was used, and the concentrations of reactants were equivalent to those of Example 1, such that the reaction solutions contained 1.7% vinylamide polymer and 0.4% glyoxal by weight. Separate reactions were run at 14 different, fixed reaction temperatures, in two degree increments from 4 to 30° C. Each condition was repeated several times, varying only the reaction solution pH, until the required reaction end point was reached within the specified reaction duration, specifically 18 to 22 minutes. For all reactions the reaction solution pH was controlled by the drop-wise addition of 5 percent by weight solutions of sodium hydroxide or sulfuric acid. The end point target for these reactions was defined as an increase in turbidity of the reaction solution of 4 to 10 NTUs above the starting turbidity of the reaction solution. The data for those reactions which met the acceptable reaction rate criteria is illustrated in FIG. 1 and conforms to Equation 1 discussed above.

Example 3

Adduct Efficiency as a Function of % Glyoxal Consumed and Net Turbidity Change

A series of glyoxalation reactions were performed with the same starting vinylamide polymer described in Example 1. In these glyoxalation reactions, the duration and the reaction solution pH were varied to produce adducts with varying extents of reaction between the vinylamide polymer and glyoxal. The extent of reaction was quantified by measuring the quantity of unreacted glyoxal remaining in the adduct solutions after formation was completed. The goal of these experiments was to determine the effect of varying the extent of reaction on the efficiency of the formed adducts as dry and wet strength aids.

All reactions were performed at ambient temperature, and at vinylamide polymer and glyoxal concentrations of 1.7% and 0.3% by weight, respectively. The reaction solution pH, the reaction duration, the net turbidity change in NTUs and the percent glyoxal consumed are shown for each reaction condition in the following Table. For all reactions the reaction solution pH was controlled by the drop-wise addition of 5 percent by weight solutions of sodium hydroxide or sulfuric acid. In each reaction, the pH was held constant at the prescribed value for the full extent of the reaction duration. The data are depicted in Table 3.

TABLE 3

| Sample | Reaction pH | Reaction Time (min) | Net Turbidity Change | % Glyoxal Consumed |
|---|---|---|---|---|
| A | 9.5 | 0 | 0.00 | 0.00% |
| B | 9.5 | 2 | −0.05 | 11.79% |
| C | 9.5 | 4 | 0.00 | 25.61% |
| D | 9.5 | 6 | 0.57 | 37.71% |
| E | 9.5 | 8 | 0.99 | 44.42% |
| F | 9.5 | 12 | 3.25 | 55.49% |
| G | 9.5 | 18 | 11.30 | 60.37% |
| H | 9.5 | 30 | 39.78 | 68.81% |
| I | 9.5 | 120 | 160.55 | 80.19% |
| J | 10.5 | N/D* | 500.78 | 82.63% |
| K | 8.0 | 15 | 0.00 | 8.48% |
| L | 8.0 | 30 | 0.31 | 12.88% |

The twelve adducts (A-L) were incorporated into hand sheets by the following method: A slurry of cellulose fibers containing 50% bleached hardwood fibers and 50% bleached softwood fibers, a freeness of 500 (CSF), a consistency of 0.86% and a pH of 6.8 was produced for this experiment. Four hundred (400) gram aliquots of the fiber slurry were heated to 130 degrees F., placed under mixing, and the various adducts were added at a rate of 5 pounds per ton of oven dried fibers. After adduct addition, the fiber slurries were mixed for 20 seconds and then transferred to a sheet mold, where hand sheets with an approximately area of 200 square centimeters and bone dry mass of 3.0 grams were formed. The wet fiber webs were then couched from the sheet mold onto blotter paper and run through a pneumatic press at a nip pressure of 40 psi. The pressed sheets were then fed into a steam heated rotary drum drier for a period of 2 minutes at 240 degrees Fahrenheit (° F.). The dried sheets were then placed in a controlled atmosphere of 73° F. and 50% relative humidity for a period of 24 hours prior to performing strength tests on the sheets.

The mass of each hand sheet was measured and recorded, and then the hand sheets were tested for dry and initial wet Mullen burst strength. The measurements for the Mullen burst strength were then divided by the mass of the individual hand sheets to eliminate the effect of variations in sheet weight on the strength results.

Figure 2:
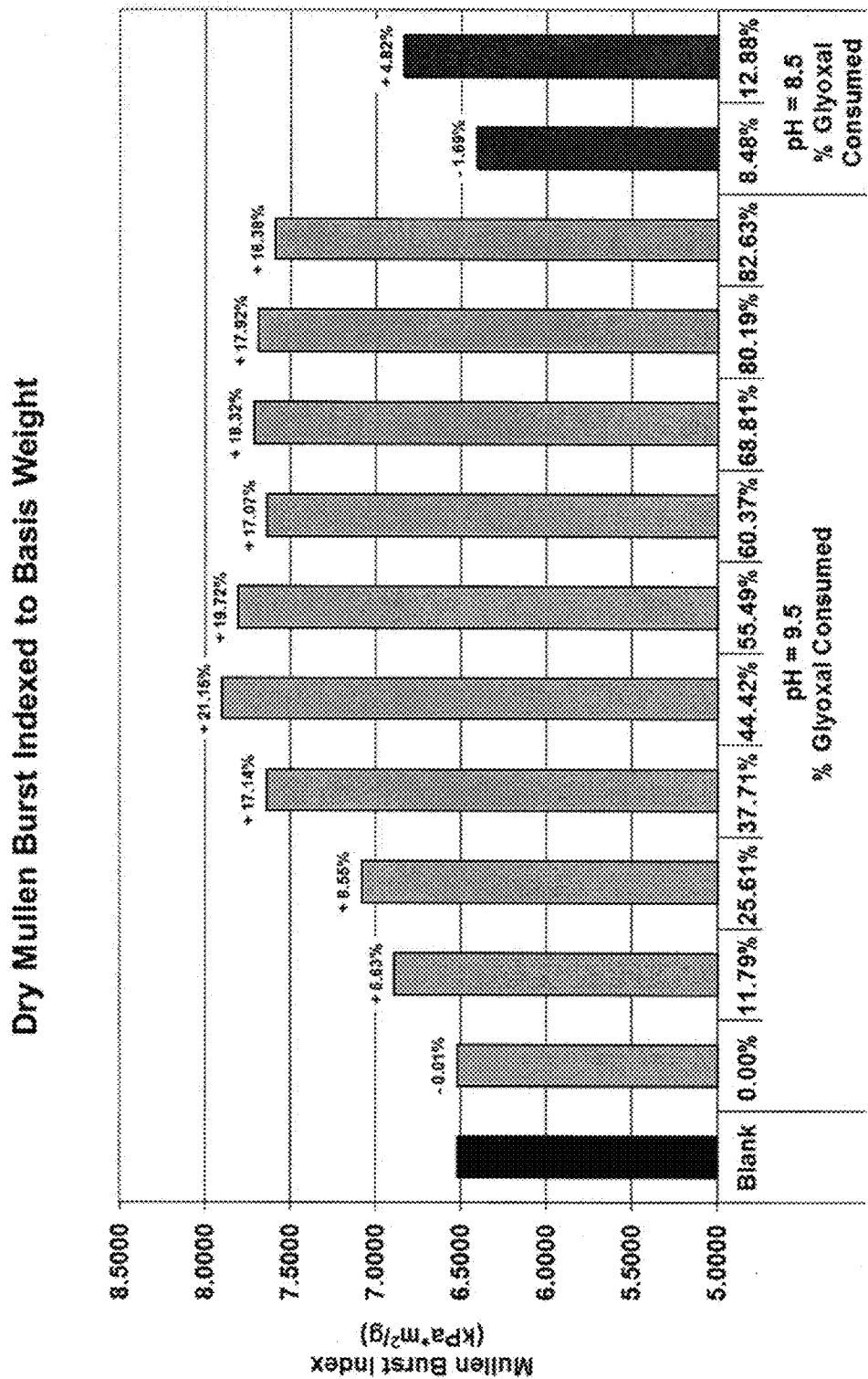
FIG. 2 is a bar graph illustrating dry Mullen Burst Index as a function of percent of glyoxal consumed during formation of the polyvinylamide cellulose reactive adduct. The figure is based on data obtained from experiments described in Examples 2 and 3.
Figure 3:
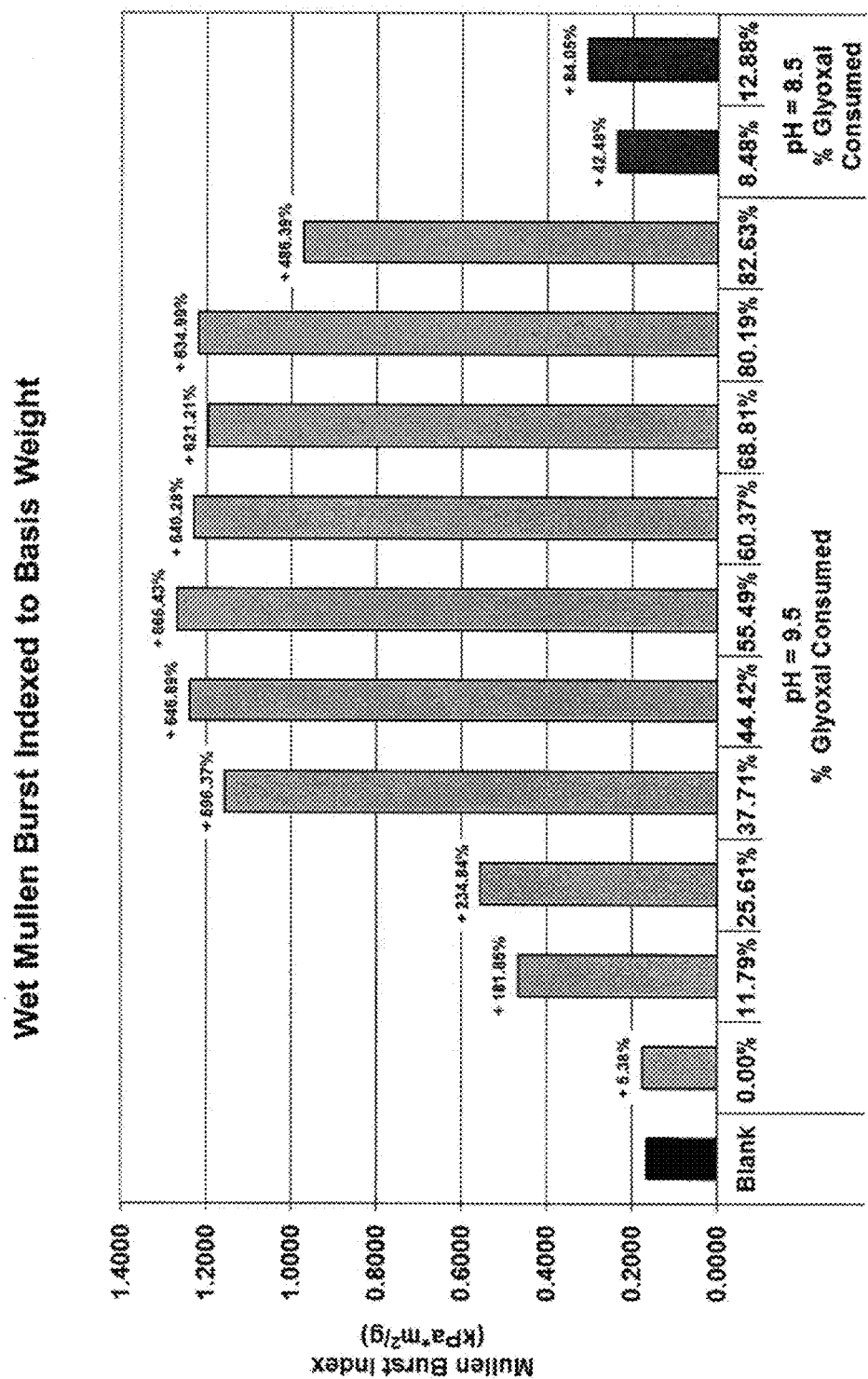
FIG. 3 is a bar graph illustrating wet Mullen Burst Index as a function of percent of glyoxal consumed during formation of the polyvinylamide cellulose reactive adduct. The figure is based on data obtained from experiments described in Examples 2 and 3.

The dry and initial wet Mullen burst strength of the hand sheets containing 5 pounds per ton of adducts A through L are depicted in FIGS. 2 and 3.

Example 4

Determination of the Critical Concentration for Polyvinylamides of Varying Mw

A set of seven compositionally-equivalent vinylamide polymers was synthesized with varying weight average molecular weights. The seven polymers were all copolymers of 90 weight percent acrylamide and 10 weight percent polydiallyldimethylammonium chloride (DADMAC). The weight average molecular weight of each of these seven polymers is shown in Table 4 below.

Samples A, B, C, and D were synthesized by heterogeneous suspension polymerization, and samples E, F, and G were synthesized by aqueous solution polymerization.

Average molecular weight was determined for samples A and B using a DAWN multi-angle light scattering detector in combination with a differential refractive index detector. In the light scattering experiment, the amount of light scattered at a given angle was directly proportional to the weight average molar mass and the concentration. A second order Zimm plot was used to generate molar mass data with a dn/dc (specific refractive index increment) value of 0.1800 (angles 4-15).

For samples C thru G, the average molecular weight was determined by conventional calibration techniques using acetate buffer and the following columns: TSK PWXL (Guard+G6000+G3000). Polyethylene oxide and polyethylene glycol standards were used to calibrate the column set.

TABLE 4

Vinylamide Polymer Mw

| Sample | | | | | | |
|---|---|---|---|---|---|---|
| A | B | C | D | E | F | G |
| Mw 3.93 MM | 1.36 MM | 585M | 331M | 140M | 64M | 13M |

Mw expressed in Daltons, where MM = million, M = thousand

Example 5

Glyoxalation at Different Concentrations to Determine Critical Concentration

Three separate aqueous reaction mixtures of each of the three vinylamide polymers, B, E, and G were made at concentrations in close proximity to the anticipated Critical Concentration for each of the polymers. Enough glyoxal was added to each of the nine polymer solutions such that a 4:1 amide:glyoxal molar ratio was established for each. For each polymer solution, 5 wt. % aqueous solution of sodium hydroxide was added drop-wise and continued until the pH of the solution reaches 9.2. Sodium hydroxide was administered as needed to maintain a nearly constant pH of 9.2 for 30 minutes. At time zero and at 5 minute intervals during the 30 minute reaction time, 20 milliliter (ml) samples were collected from the reaction beakers and immediately quenched by lowering the pH to 4.0 with dilute sulfuric acid. In all, seven samples were collected for each polymer reaction mixture. The viscosity of the seven samples from each reaction mixture was measured using a Type 2 SCHOTT suspended level viscometer, and is reported in centistokes. The data are depicted in Table 5.

TABLE 5

| | Sample B | | | Sample E | | | Sample G | | |
|---|---|---|---|---|---|---|---|---|---|
| Sample # | 0.60% | 0.80% | 1.60% | 1.25% | 1.50% | 1.75% | 3.2% | 3.6% | 4.0% |
| 1 | 3.25 | 5.12 | Gelled* | 2.11 | 2.30 | 2.65 | 1.75 | 1.81 | 1.94 |
| 2 | 2.67 | 5.10 | — | 2.11 | 2.25 | 2.72 | 1.75 | 1.81 | 2.14 |
| 3 | 2.62 | 5.22 | — | 2.04 | 2.23 | 2.81 | 1.73 | 1.85 | 2.17 |
| 4 | 2.60 | 5.28 | — | 1.98 | 2.22 | 2.93 | 1.71 | 1.87 | 2.23 |
| 5 | 2.56 | 5.34 | — | 1.87 | 2.19 | 3.05 | 1.70 | 1.87 | 2.31 |
| 6 | 2.43 | 5.81 | — | 1.81 | 2.19 | 3.17 | 1.69 | 1.87 | 2.32 |
| 7 | 2.35 | 6.58 | — | 1.74 | 2.16 | 3.26 | 1.67 | 1.88 | 2.38 |

*At a concentration of 1.6% the reaction mixture of Sample B gelled before a sample could be collected and quenched.

In the case of all three polymers, the results in Table 5 show that the Critical Concentration lies between two of the three tested concentrations. Specifically, the Critical Concentration for:
Sample B lies between 0.6 and 0.8%;
Sample E lies between 1.50 and 1.75%; and
Sample G lies between 3.20 and 3.6% vinylamide polymer concentration, based on the total weight of the reaction mixture.

Example 6

Adduct Efficiency as a Function of Base Polymer Molecular Weight

Samples of the glyoxalated vinylamide polymers B, E, and G of Example 5 at aqueous vinylamide polymer concentrations of 0.6%, 1.25%, and 3.2% (all below the Critical Concentration) respectively, were tested for dry strengthening efficiency. A commercially-available glyoxalated-polyvinylamide product was included in the analysis as a reference point. The cellulose substrate used for the testing was obtained from a linerboard machine with a 100% post-consumer stock stream. Hand sheets of 140 grams per square meter weight were prepared for this testing.

The data are depicted in Table 6. The results in Table 6 show the dry strengthening efficiency of each adduct when added at a rate of 6 dry pounds of adduct per dry ton of paper (3 kg/metric ton).

TABLE 6

Tensile Strength Results

| Additive | None | Adduct of "B" | Adduct of "E" | Adduct of "G" | Commercial Product* |
|---|---|---|---|---|---|
| Load in Kg | 8.55 | 8.59 | 9.34 | 9.14 | 8.99 |

*The Commercial Product has a Mw of approximately 10,000 and a glyoxal to amide molar ratio of about 1 to about 2.5.

What is claimed is:

1. A method for preparing a cellulose reactive functionalized polyvinylamide adduct using a continuous process comprising:
continuously reacting a substantially aqueous reaction mixture of a vinylamide polymer comprising at least about 70 wt. % acrylamide monomer or methacrylamide monomer and 0 to about 30 wt. % cationic monomer selected from the group consisting of diallyldialkyl ammonium salts, (dialkylamino)alkyl(meth)acrylates acid addition or quaternary salts, 2-vinylpyridines acid addition or quaternary salts, dialkylamino alkyl(meth) acrylamides acid addition or quaternary salts, (p-vinylphenyl)-trimethylammonium chloride, 1-methacryloyl-4-methyl piperazine, and acid addition or quaternary ammonium salts thereof; and a cellulose reactive agent selected from the group consisting of glyoxal, glutaraldehyde, furan dialdehyde, 2-hydroxyadipaldehyde, succinaldehyde, dialdehyde starch, diepoxy compounds, and combinations thereof, at a temperature of about 2° C. to about 50° C. and a reaction pH set point of about 8.5 to about 12, for a reaction time of about 2 minutes to about 150 minutes, wherein:
i) the temperature of incoming water is continuously measured;
ii) the pH of the reaction mixture is adjusted to maintain an approximately constant reaction rate based on the following equation:

$$pH=-0.0404T+10.961$$

where: pH=reaction pH set point
T=reaction temperature (° C.);
iii) between 12% and 85% of the cellulose reactive agent is consumed, and the molar ratio of the amide functionality on the vinylamide polymer to cellulose reactive agent is between 6 to 1 and 2.5 to 1; and
iv) the concentration of the vinylamide polymer prior to and during formation of the adduct is about 0.5-6% of the total reaction mixture, thereby forming the adduct.

2. The method of claim 1, wherein the adduct is prepared at a temperature of about 4° C. to about 30° C. and a pH of about 8.5 to about 11.5, and a reaction time of about 2 to 90 minutes.

3. The method of claim 1, wherein the concentration of the vinylamide polymer prior to and during formation of the adduct is about 1% to 4%.

4. The method according to claim 3, wherein the vinylamide polymer concentration is less than about 4 weight % of the total reaction mixture, and has an average molecular weight of about 50,000 to about 1,000,000 Daltons.

5. The method of claim 1, wherein about 40% to 60% of the cellulose reactive agent is consumed.

6. The method according to claim 1, wherein the cellulose reactive agent comprises more than one aldehyde functionality.

7. The method according to claim 1, wherein the cellulose reactive agent comprises glyoxal.

8. The method according to claim 1, wherein the vinylamide polymer is a copolymer formed from acrylamide monomer.

9. The method according to claim 1, wherein the vinylamide polymer is formed from acrylamide monomer and the cationic monomer is selected from the group consisting of diallyldialkyl ammonium salts.

10. The method according to claim 9, wherein the cationic monomer is diallyldimethyl ammonium chloride.

11. The method according to claim 1, wherein the vinylamide polymer or the polyvinylamide adduct is linear, crosslinked, chain-transferred, or crosslinked and chain-transferred.

12. The method according to claim 11, wherein the vinylamide polymer or the polyvinylamide adduct is crosslinked using at least a difunctional monomer selected from the group consisting of methylene bis(meth)acrylamide, triallylammonium chloride, tetraallyl ammonium chloride, polyethyleneglycol diacrylate, polyethyleneglycol dimethacrylate, N-vinyl acrylamide, divinylbenzene, tetra(ethyleneglycol)diacrylate, dimethylallylaminoethylacrylate ammonium chloride, sodium salt of diallyloxyacetic acid, diallyloctylamide, trimethyllpropane ethoxylate triacrylate, N-allylacrylamide, N-methylallylacrylamide, pentaerythritol triacrylate, and combinations thereof.

13. The method according to claim 1, wherein the vinylamide polymer is a copolymer of (meth)acrylamide and diallyldimethylammonium halide.

14. The method according to claim 1, wherein the vinylamide polymer has an average molecular weight of about 5000 to about 5,000,000 Daltons.

15. The method according to claim 1, wherein adduct formation is monitored by measuring a change in turbidity or viscosity of the aqueous reaction, wherein the change in turbidity results from the adduct formation and the turbidity change is in the range of 0.5 to 500 NTU (nephelometric units).

16. The method according to claim 1, wherein the vinylamide polymer, the cellulose reactive agent, and the base are combined into one flow, and wherein said flow has a flow rate of approximately 2.6 milliliters per minute.

17. A method of preparing an aqueous cellulosic slurry comprising
continuously reacting a substantially aqueous reaction mixture of a vinylamide polymer comprising at least about 70 wt. % acrylamide monomer or methacrylamide monomer and 0 to about 30 wt. % cationic monomer selected from the group consisting of diallyldialkyl ammonium salts, (dialkylamino)alkyl(meth)acrylates acid addition or quaternary salts, 2-vinylpyridines acid addition or quaternary salts, dialkylamino alkyl(meth)acrylamides acid addition or quaternary salts, (p-vinylphenyl)-trimethylammonium chloride, 1-methacryloyl-4-methyl piperazine, and acid addition or quaternary ammonium salts thereof; and a cellulose reactive agent selected from the group consisting of glyoxal, glutaraldehyde, furan dialdehyde, 2-hydroxyadipaldehyde, succinaldehyde, dialdehyde starch, diepoxy compounds, and combinations thereof, at a temperature of about 2° C. to about 50° C. and a reaction pH set point of about 8.5 to about 12, for about 2 minutes to about 150 minutes;

wherein:
i) the temperature of incoming water is continuously measured;
ii) the pH of the reaction mixture is adjusted to maintain an approximately constant reaction rate based on the following equation:

$$pH=-0.0404T+10.961$$

where: pH=reaction pH set point
T=reaction temperature (° C.);
iii) between 12% and 85% of the cellulose reactive agent is consumed, and the molar ratio of the amide functionality on the vinylamide polymer to cellulose reactive agent is between 6 to 1 and 2.5 to 1; and
iv) the concentration of the vinylamide polymer prior to and during formation of the adduct is about 0.5-6% of the total reaction mixture, thereby forming the adduct; and
adding the adduct to a slurry to form the aqueous cellulosic slurry.

18. The method according to claim 17, wherein the vinylamide polymer, the cellulose reactive agent, and the base are combined into one flow, and wherein said flow has a flow rate of approximately 2.6 milliliters per minute.

19. A method of making a paper or board comprising
continuously reacting a substantially aqueous reaction mixture of a vinylamide polymer comprising at least about 70 wt. % acrylamide monomer or methacrylamide monomer and 0 to about 30 wt. % cationic monomer selected from the group consisting of diallyldialkyl ammonium salts, (dialkylamino)alkyl(meth)acrylates acid addition or quaternary salts, 2-vinylpyridines acid addition or quaternary salts, dialkylamino alkyl(meth)acrylamides acid addition or quaternary salts, (p-vinylphenyl)-trimethylammonium chloride, 1-methacryloyl-4-methyl piperazine, and acid addition or quaternary ammonium salts thereof; and a cellulose reactive agent selected from the group consisting of glyoxal, glutaraldehyde, furan dialdehyde, 2-hydroxyadipaldehyde, succinaldehyde, dialdehyde starch, diepoxy compounds, and combinations thereof, at a temperature of about 2° C. to about 50° C. and a reaction pH set point of about 8.5 to about 12, for about 2 minutes to about 150 minutes;

wherein:
  i) the temperature of incoming water is continuously measured;
  ii) the pH of the reaction mixture is adjusted to maintain an approximately constant reaction rate based on the following equation:
  $$pH = -0.0404T + 10.961$$
  where: pH=reaction pH set point
  T=reaction temperature (° C.);
  iii) between 12% and 85% of the cellulose reactive agent is consumed, and the molar ratio of the amide functionality on the vinylamide polymer to cellulose reactive agent is between 6 to 1 and 2.5 to 1; and
  iv) the concentration of the vinylamide polymer prior to and during formation of the adduct is about 0.5-6% of the total reaction mixture, thereby forming the adduct; and adding the adduct to paper or board.

20. The method according to claim 19, wherein the vinylamide polymer, the cellulose reactive agent, and the base are combined into one flow, and wherein said flow has a flow rate of approximately 2.6 milliliters per minute.

* * * * *